129,323

UNITED STATES PATENT OFFICE.

JOHN CULIN, OF PHILADELPHIA, PENNSYLVANIA, ASSIGNOR TO HIMSELF, GEORGE K. RICHARDS, AND AMBROSE WARREN, OF SAME PLACE.

IMPROVEMENT IN THE PREPARATION OF HERBS FOR USE IN COOKERY, &c.

Specification forming part of Letters Patent No. 129,323, dated July 16, 1872.

Specification describing an Improvement in the Preparation of Cooking-Herbs for Sale, invented by JOHN CULIN, of Philadelphia, Pennsylvania.

*Improvement in the Preparation of Cooking-Herbs for Sale.*

My invention consists of a box or other equivalent package of thrashed and sifted culinary herbs, the whole forming a new article of trade, especially useful both for dealers, purchasers, and cooks.

Cooking-herbs, such as thyme, sage, sweet marjoram, &c., have heretofore been sold in bundles or in a ground state. The bundles, owing to their bulky character, are inconvenient to transport, occupy much useful space in stores, and are unhandy for the cook, who is compelled to strip off from the said bundle as much as may be required, and then to triturate the leaves, operations which demand more or less time and attention. By grinding the herbs much of their strength is necessarily lost, and the particles are apt to be inconveniently small.

I procure bales of the dried herbs, and in preparing them for the market thrash masses of them with a stick, so as to break the leaves and stalks without triturating them. I then pass the thrashed mass through a sieve having meshes of appropriate size, so that the useless stalks may be separated from the highly-flavored leaves, and so that the particles of the latter may be as nearly as possible of uniform size. By thus thrashing and sifting, the leaves are reduced to the proper condition for immediate use in culinary preparations, without the necessity of any trituration by the cook, and the thrashed particles being much larger than the ground herbs must necessarily retain their flavor for a greater length of time than the latter. The thrashed and sifted herbs are placed in small boxes and properly labeled prior to their delivery to the retail grocer or other dealer, in whose store they occupy but little room, as they can be arranged in a compact mass, from which package after package can be at once handed to purchasers without any delay. The boxes are, moreover, handy for the cook, who can remove as much of the contents as desired and then replace the lid, which will retain the flavor in the remaining mass of thrashed and sifted herbs.

I claim as my invention, and as a new article of trade—

A box or other equivalent package of thrashed and sifted herbs, as set forth.

In testimony whereof I have signed my name to this specification, in the presence of two subscribing witnesses.

JNO. CULIN.

Witnesses:
 WM. A. STEEL,
 HARRY SMITH.